United States Patent [19]

Saitoh et al.

[11] Patent Number: 4,855,656
[45] Date of Patent: Aug. 8, 1989

[54] DRIVERLESS CAR TRAVELLING GUIDE SYSTEM

[75] Inventors: Yoshihiro Saitoh, Aichi; Minoru Kondoh, Kounan; Yukio Komatsu, Kani, all of Japan

[73] Assignee: Murata Kikai Kabushiki Kaisha, Kyoto, Japan

[21] Appl. No.: 82,441

[22] Filed: Aug. 6, 1987

[30] Foreign Application Priority Data

Aug. 13, 1986 [JP] Japan .................. 61-189836

[51] Int. Cl.⁴ ............................................. G05D 1/00
[52] U.S. Cl. ..................................... 318/587; 180/167
[58] Field of Search ............... 318/582; 180/167, 168, 180/169

[56] References Cited

U.S. PATENT DOCUMENTS

| | | | |
|---|---|---|---|
| 4,079,801 | 3/1978 | Dobson | 318/587 X |
| 4,160,488 | 7/1979 | Blakeslee | 180/168 |
| 4,284,941 | 8/1981 | Requeiro | 180/168 |
| 4,333,147 | 6/1982 | Requeiro et al. | 180/168 |
| 4,344,498 | 8/1982 | Lindfors | 318/587 |
| 4,577,140 | 3/1986 | Schmidt | 318/587 |
| 4,593,239 | 6/1986 | Yamamoto | 318/587 |
| 4,656,406 | 4/1987 | Housekamp | 318/587 |
| 4,658,928 | 4/1987 | Seo | 318/587 X |
| 4,700,119 | 10/1987 | Mie | 318/587 |
| 4,700,427 | 10/1987 | Knepper | 318/587 X |

FOREIGN PATENT DOCUMENTS 0097411 5/1985 Japan .................. 318/587

Primary Examiner—Benjamin Dobeck
Attorney, Agent, or Firm—Spensley, Horn, Jubas & Lubitz

[57] ABSTRACT

An electroconductive guide line is laid along a travelling path of a driverless car on the ground side, while on the driverless car side are provided a means for inducing electromotive force in the guide line and a means for detecting a magnetic field created upon generation of an electric current in the guide line.

1 Claim, 5 Drawing Sheets

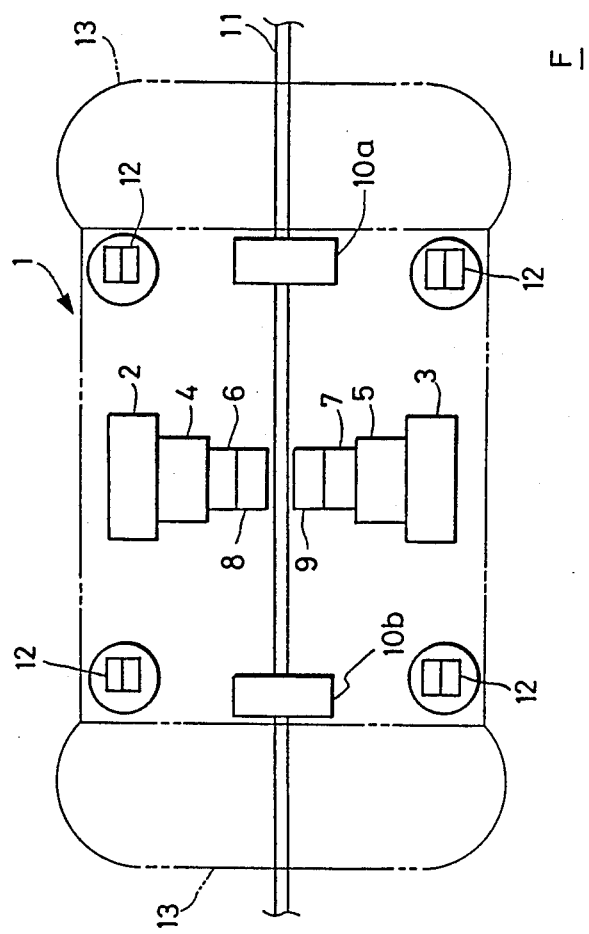

DRIVERLESS CAR TRAVELLING GUIDE SYSTEM

FIELD OF THE INVENTION AND RELATED ART STATEMENT

The present invention relates to a driverless car used for the conveyance of good or for other purposes in a warehouse, a factory, or the like.

Heretofore, as driverless car guiding methods there have been known an electromagnetic induction method and an optical induction method. According to the electromagnetic induction method, an electric wire is buried under the floor of a travelling path of a driverless car and a magnetic field created by the supply of an electric current to the electric wire is detected by a magnetic field detector mounted on the driverless car to let the car travel along the electric wire. According to the optical induction method, a line of high reflectivity is applied or sticked onto the floor surface of the travelling path (in many cases a reflective tape is sticked thereon) and the said line is detected by a photo detector while irradiating the travelling path from the driverless car, allowing the car to travel along the said line.

The following problems have been involved in the two conventional induction methods referred to above. In the optical induction method, once the reflective line is stained, the floor surface with the line not sticked thereon and the line itself become scarcely different in the quantity of reflected light, so it becomes impossible to detect the line. To avoid this inconvenience it has been necessary to keep the interior of the factory clean. Or it has been impossible for some factories to adopt this method.

Problems have been encountered also in the electromagnetic induction method. For example, the electric wire burying work requires considerable labor and cost, and the electric wire once buried is difficult to change. Further, the control for the supply of an electric current to the electric wire is complicated, resulting in increase of the cost.

Further, even other than the above two induction methods, there have been proposed many induction methods, but few of them have been put to practical use, involving problems.

OBJECT AND SUMMARY OF THE INVENTION

It is an object of the present invention to provide a driverless car travelling guide system in which a guide line can be laid in a simple manner.

According to the present invention, an electroconductive guide line is laid along a travelling path of a driverless car on the ground side, while on the driverless car side are provided a means for inducing electromotive force in the said guide line and a means for detecting a magnetic field created upon generation of an electric current in the guide line.

An electric current is generated in the guide line by the means for generating electromotive force in the same line on the ground side and a magnetic field created by the said electric current is detected by the detecting means provided on the driverless car to detect the position of the car with respect to the guide line, allowing the car to be guided along the said line.

BRIEF DESCRIPTION OF THE DRAWINGS

FIG. 10 is a schematic plan view of a driverless car to which the present invention is applied.

DETAILED DESCRIPTION OF PREFERRED EMBODIMENTS

Figure 1:
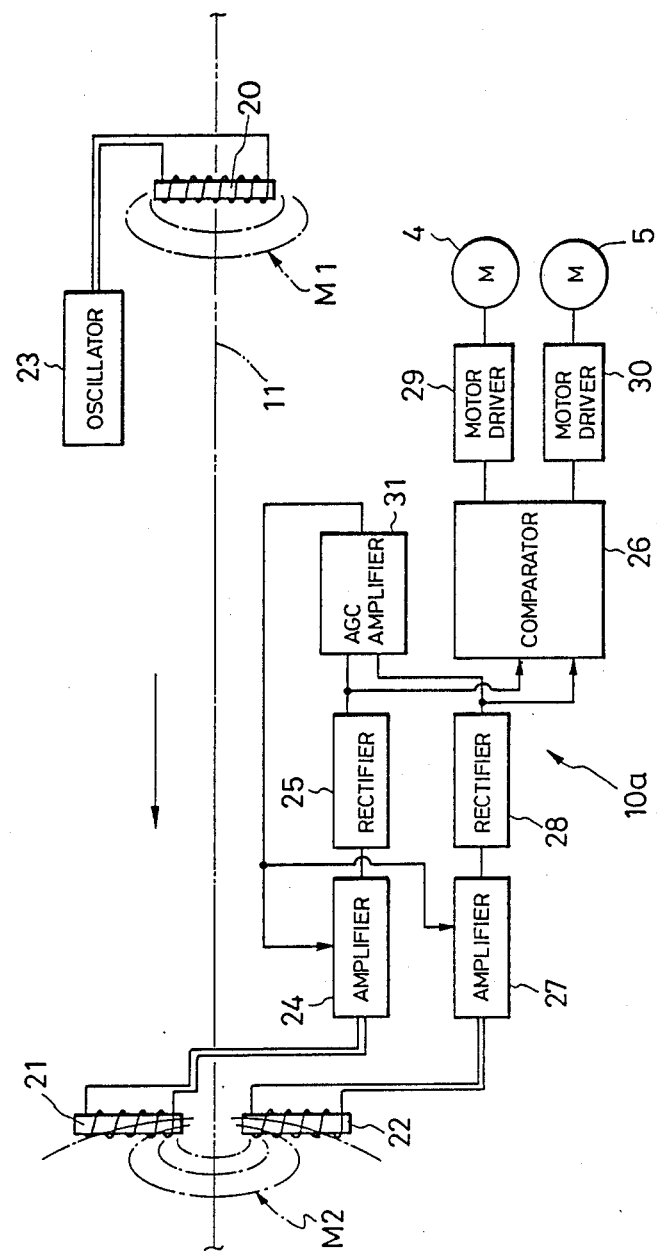
FIG. 1 is a block diagram showing the structure of a guide line sensor embodying the present invention.

Referring to FIG. 10, there is schematically illustrated an example of a driverless car to which the present invention is applied. In this driverless car indicated at 1 there are provided a pair of driving wheels 2 and 3 on right and left sides of an approximately longitudinally central position of the car body, with driving motors 4 and 5 being connected directly to the driving wheels 2 and 3, respectively. The driverless car 1 can travel straight forward or backward upon rotation of the right and left driving wheels at the same number of revolutions in the same direction, turn at different revolutions of the driving wheels in the same direction, and rotate round its own axis and change direction in the same position upon rotation of the driving wheels at the same number of revolutions in opposite directions. Numerals 6 and 7 denote brakes for decelerating or stopping the driving wheels 2 and 3, respectively; numerals 8 and 9 denote pulse generators for detecting the number of revolutions of the driving wheels 2 and 3, respectively; and numerals 10a and 10b denote guide line sensors for detecting the position of a guide line 11 sticked on a floor F. Either the sensor 10a or the sensor 10b is adapted to operate depending on the travelling direction of the driverless car 1. Numeral 12 denotes a driven wheel which is supported in a caster-like condition by the car body, and numeral 13 denotes a bumper.

Referring now to FIG. 1, the guide line sensor 10a is illustrated as a block diagram. The sensor 10a is composed of a transmitting coil 20, a first receiving coil 21 and a second receiving coil 22. Also as to the structure of the other guide line sensor 10b, its structure is the same as that of the sensor 10a, so explanation thereon will be omitted.

The transmitting coil 20 is connected to an oscillator 23. The first receiving coil 21 is connected to a comparator 26 through an amplifier 24 and a rectifier 25, and the second receiving coil 22 is also connected to the comparator 26 through an amplifier 27 and a rectifier 28. Signals provided from the comparator 26 are input to motor drivers 29 and 30 of the driving motors 4 and 5 for the right and left driving wheels. Signals provided from the rectifiers 25 and 28 are also input to an autogain control amplifier 31, whereby the amount of amplification in both amplifiers 24 and 27 is controlled feedbackwise. The transmitting coil 20 and the first and second receiving coils 21, 22 are disposed in positions in which the magnetic field on the side of the transmitting coil 20 is not influenced by the receiving coils 21 and 22 side.

Figure 4:
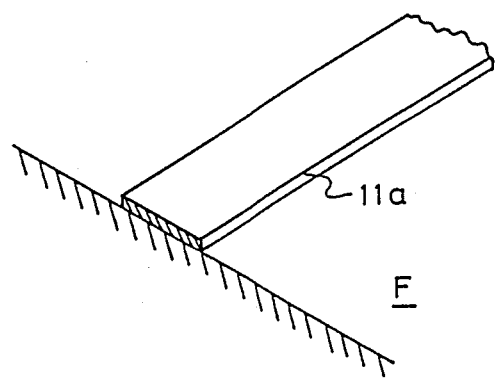
FIG. 4 is a perspective view showing an example of a guide line as laid.
Figure 5:
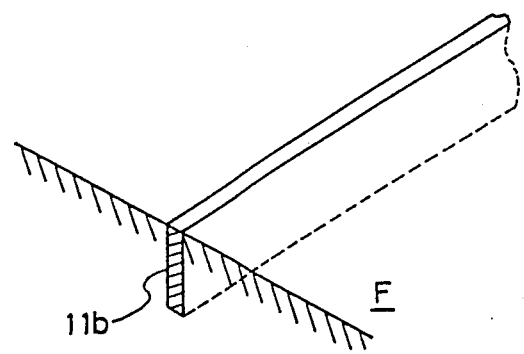
FIG. 5 is a perspective view showing another example of a guide line.
Figure 6:
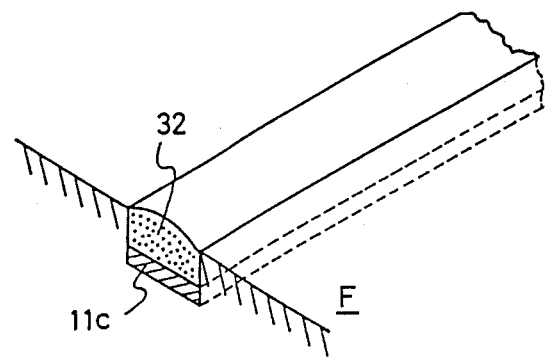
FIG. 6 is a perspective view showing a further example of a guide line.

The guide line 11 is formed on the floor of the travelling path of the driverless car by sticking an electroconductive metallic tape or the like, for example, an aluminum tape 11a as shown in FIG. 4, onto the floor, or by burying an aluminum tape 11b longitudinally in the floor F after cutting as shown in FIG. 5, or by burying an aluminum tape 11c in the floor F after cutting and filling thereover a back-filling material.

Figure 7:
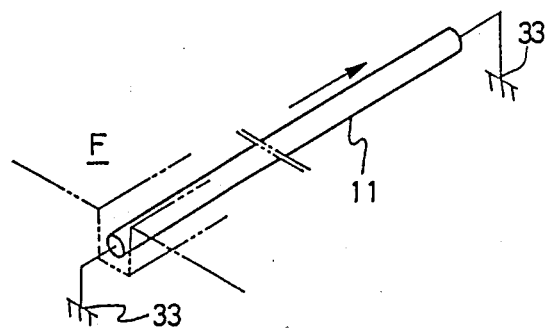
FIG. 7 is a perspective view showing an example for maintaining a guide line in a state capable of being supplied with electricity.
Figure 8:
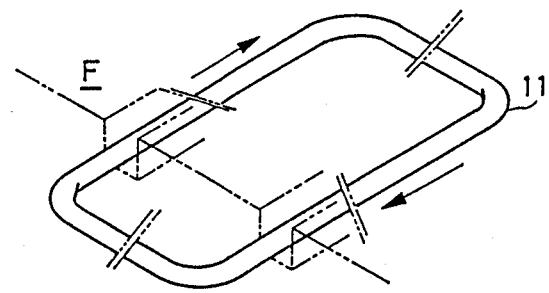
FIG. 8 is a perspective view showing another example for the same purpose.
Figure 9:
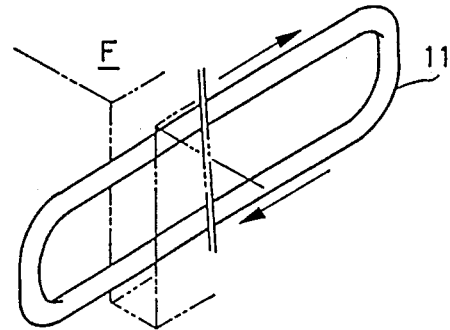
FIG. 9 is a perspective view showing a further example for the same purpose.

The guide line 11 is provided in a state capable of being supplied with electricity. More specifically, both ends thereof are connected to ground at 33 as shown in FIG. 7, or a loop is formed in a planar direction as shown in FIG. 8, or in a depth direction as shown in FIG. 9.

The guiding operation for the driverless car 1 will now be described. The oscillator 23 is operated to generate a magnetic field M1 from the transmitting coil 20, resulting in that induced current flows through the electroconductive guide line 11. Then, a magnetic field M2 is generated around the guide line 11 by that induced current, resulting in that induced current is allowed to flow through the first and second receiving coils 21 and 22 on the driverless car 1 by means of the magnetic field M2.

Figure 2:
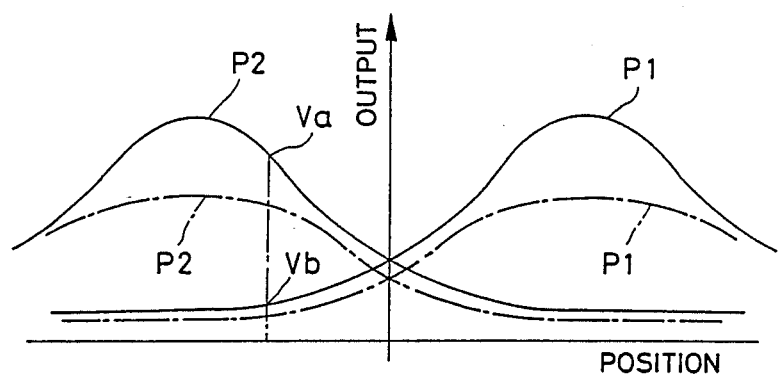
FIG. 2 is a graph showing changes in the outputs of induced currents flowing through receiving coils caused by changes in the guide line position.

The output of the induced current flowing through the first and second receiving coils varies depending on the distance between the receiving coils 21, 22 and the guide line 11. It becomes maximum when the guide line 11 is positioned just under each such receiving coil. As the guide line 11 goes away from the said position, the output of the induced current decreases little by little. This condition is graphically shown in FIG. 2, in which the position of the guide line 11 is plotted along the axis of abscissa and the output of the induced current flowing through the receiving coils plotted along the axis of ordinate. A graph curve P1 represents the output of the induced current in the first receiving coil 21, while a graph curve P2 represents the output of the induced current in the second receiving coil 22. The outputs from the receiving coils 21 and 22 become equal to each other when the guide line 11 occupies the position intermediate between both receiving coils.

Figure 3:
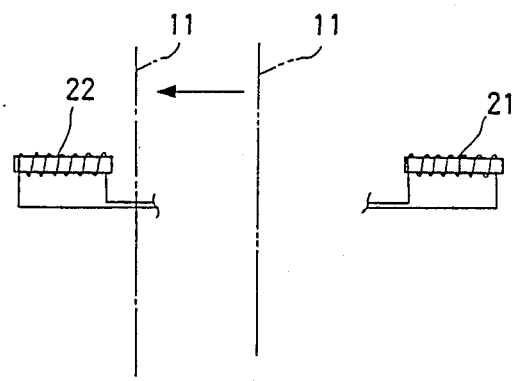
FIG. 3 is a schematic plan view for explaining a positional relation between the receiving coils and a guide line.

The outputs provided from the first and second receiving coils 21 and 22 are input to the comparator 26 through the amplifier 24, rectifier 25 and the amplifier 27, rectifier 28, respectively. In the comparator 26 there is calculated a dislocation in travelling of the driverless car 1 and the number of revolutions of the motors 4 and 5 is changed to correct the dislocation. For example, assuming that the guide roller 11 is closer to the second receiving coil 22 as shown in FIG. 3 (indicated by a single-dot chain line), although actually the guide line 11 is stationary and the second receiving coil 22 occupies a position closer to the guide line 11 with movement of the driverless car 1, the outputs Va and Vb provided from the first and second receiving coils 21 and 22 are in the relation of Va<Vb as is apparent also from FIG. 2. Conversely, when the guide line 11 is closer to the first receiving coil 21, the Va—Vb relation is Va>Vb. Therefore, to which of both receiving coils the driverless car 1 is closer is detected by comparing the outputs of both coils.

Since the amount of amplification of the amplifiers 24 and 27 is controlled feedbackwise by the auto-gain control amplifier 31, there is no change of acceleration or deceleration in the output of the induced current provided from each receiving coil even when the driverless car 1, hence the guide line sensor 10a, rocks vertically and approaches or leaves the guide line 11. For example, if the guide line sensor 11 itself is spaced more largely than in normal condition from the floor surface, the outputs from the receiving coils 21 and 22 decrease as a whole (as indicated by the chain line in FIG. 2), so a command to increase the amount of amplification is given to the amplifiers 24 and 27 by the control amplifier 31.

According to the guide system of the present invention, as set forth hereinabove, the guide line can be laid in a very simple manner, so there can be attained economic merits and it is possible to change the travelling path easily. It is no longer necessary to provide such a control unit for the induction line as in the electromagnetic induction method, nor does the line detection become infeasible due to stain of the guide line as in the optical induction method. Thus, the guide system of the present invention can be introduced in various factories.

What is claimed is:

1. A guide system for a driverless car comprising:
    an electroconductive guide line positioned along the intended travel path of the driverless car,
    induction means associated with the driverless car for inducing a current flow in the guide line, and
    detection means associated with the driverless car for detecting a magnetic field created by the flow of electric current in the guide line,
    wherein the electroconductive guide line comprises an electroconductive metallic tape or the like and wherein the detection means further comprises:
    a first receiving coil for producing an output representative of the distance between the first receiving coil and the guide line,
    a second receiving coil from producing an output representative of the distance between the second receiving coil and the guide line, the first receiving coil and the second receiving coil being positioned on opposite sides of the driverless car,
    a comparator for comparing the output of the first receiving coil and the output of the second receiving coil and for generating a signal in response thereto,
    whereby a signal corresponding to the deviation of the driverless car from the guide line is generated by the comparator, and further comprising:
    a pair of driving wheels provided on the driverless car,
    a corresponding pair of driving motors connected respectively to the driving wheels,
    means for supplying the driving motors with the signal generated by the comparator,
    whereby the driving wheels are controlled by the driving motors in response to the deviation of the driverless car from the guide line, and further comprising:
    an amplifier and a rectifier connected respectively between each of the receiving coils and the comparator, each amplifier having an input and each rectifier having an output,
    an auto-gain control amplifier connected between the outputs of the rectifiers and the inputs of the amplifiers to thereby form a feedback loop,
    whereby a change in amplitude in the outputs of the receiving coils is automatically compensated for by the auto-gain control amplifier.

* * * * *